United States Patent [19]

Dickson et al.

[11] 4,380,446
[45] Apr. 19, 1983

[54] SIDE SEALING MECHANISM FOR A PACKAGING MACHINE

[75] Inventors: J. Douglas Dickson; J. David Sweeney; Ronald K. Coleman, all of Columbus, Ohio

[73] Assignee: Rexham Corporation, New York, N.Y.

[21] Appl. No.: 186,697

[22] Filed: Sep. 12, 1980

[51] Int. Cl.³ .............................. B31B 1/10; B31B 1/64
[52] U.S. Cl. ........................................ 493/11; 493/34; 493/197; 493/208
[58] Field of Search ............... 493/208, 205, 227, 370, 493/197, 196, 195, 194, 193, 368, 367, 34, 475, 11; 53/550, 562, 450, 373

[56] References Cited

U.S. PATENT DOCUMENTS

| | | | |
|---|---|---|---|
| 2,780,275 | 2/1957 | Rusch et al. | 493/205 X |
| 2,814,484 | 11/1957 | Stobb et al. | 493/370 X |
| 3,230,687 | 1/1966 | Nutting et al. | 53/180 |
| 3,500,726 | 3/1970 | Lense | 93/8 |
| 3,545,166 | 12/1970 | Johnson et al. | 53/29 |
| 3,553,934 | 1/1971 | Johnson et al. | 53/183 |
| 3,943,683 | 3/1976 | Kovacs et al. | 53/550 X |
| 4,170,170 | 10/1979 | Beasley et al. | 493/365 X |
| 4,305,240 | 12/1981 | Grevich et al. | 493/208 X |

*Primary Examiner*—James F. Coan
*Attorney, Agent, or Firm*—Leydig, Voit, Osann, Mayer & Holt, Ltd.

[57] ABSTRACT

Heat sealing bars are spaced circumferentially around a rotatable drum and seal together two face-to-face strips of material as the strips are drawn continuously around the drum. The sealing bars are automatically moved radially inwardly and outwardly to change the circumferential distance between the bars and the effective diameter of the drum and thereby keep the bars in register with printed material on the strips.

6 Claims, 5 Drawing Figures

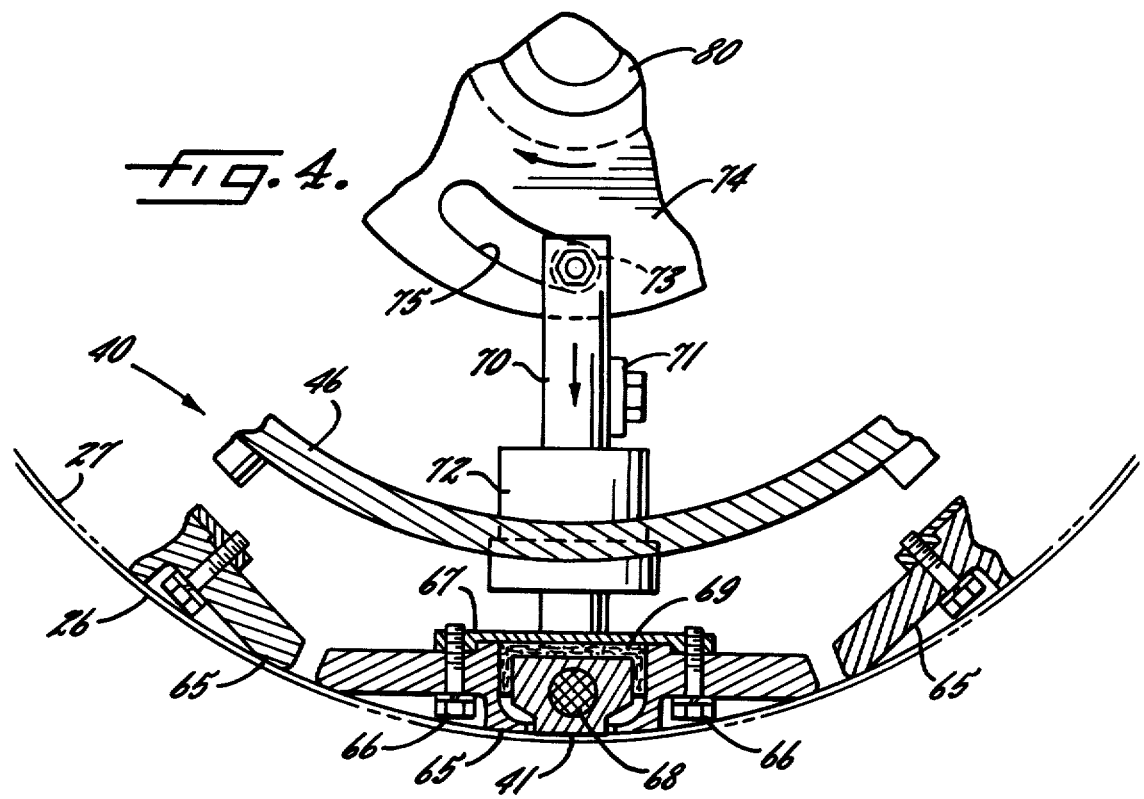
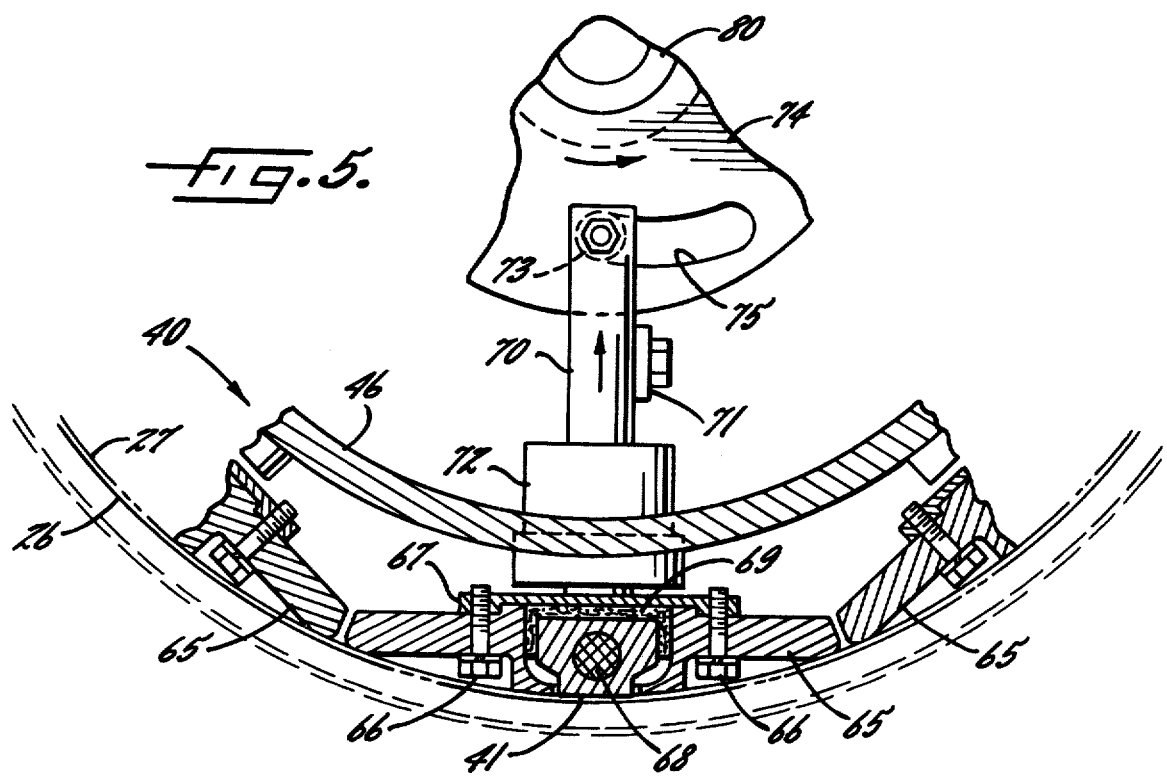

SIDE SEALING MECHANISM FOR A PACKAGING MACHINE

BACKGROUND OF THE INVENTION

This invention relates to a side sealing mechanism for a packaging machine of the type in which a flexible web of heat-sealable material is advanced and folded to form two face-to-face strips which are sealed together at longitudinally spaced positions to convert the web into series of interconnected pouches. The pouches subsequently are separated by cutting through the side seals and then are advanced through a filling station where product such as a food product is deposited into the pouches.

The invention has more particular reference to a sealing mechanism for a continuous motion packaging machine. In such a machine, the web, the folded strips and the severed pouches are advanced with continuous motion as the pouch forming and filling operations are performed. A typical continuous motion machine is disclosed in Nutting et al U.S. Pat. No. 3,230,687 and such a machine is capable of operating at significantly higher speeds than an intermittent motion machine in which the various operations are carried out when the web and the pouches dwell between successive steps.

In most instances, the web is pre-printed with a repeating pattern of labeling information, decorative artwork, advertising material and the like which ultimately appears on the outer sides of the finished pouches. In order for each pouch to have the proper appearance, it is necessary that the side seals register correctly with the printing on the web. In other words, each side seal should be located exactly at the proper area of repeat of the printed pattern on the web so that all pouches will be of proper and uniform appearance.

To keep the packaging machine operating in registration with the printing on the web, it is conventional for the web to be preprinted with photoelectric targets which are spaced longitudinally from one another in accordance with the width of the pouches. Photoelectric detectors sense the targets and produce signals which are used to control the operation of various mechanisms of the machine. Packaging machines in which photoelectric detectors sense preprinted targets to maintain web registration are disclosed in Lense U.S. Pat. No. 3,500,726, in Johnson et al U.S. Pat. No. 3,545,166 and in Johnson et al U.S. Pat. No. 3,553,934.

Difficulty is encountered in obtaining proper registration of the side seals because, in many instances, the printed pattern and the photoelectric targets may not repeat at exactly the same interval throughout the entire length of the web. Variations in the repeat interval may be caused by the web being stretched or tensioned by different amounts during its advance, by temperature fluctuations, by imperfections in the printing process itself and by other factors. While the variation of the repeat interval within a given group of pouches may be very minute, the cumulative variations that may occur in a web which is several hundred feet in length can result in the side seals being formed out of registration with the printed material and thereby ruin the appearance of the pouches.

SUMMARY OF THE INVENTION

The general aim of the present invention is to provide a new and improved side sealing mechanism which is especially adapted for use with a high speed continuous motion packaging machine and which is particularly characterized by its ability to form the side seals in virtually perfect registration with the printing of the web regardless of any variations that might be present in the repeat interval.

A more detailed object is to provide a side sealing mechanism in which the side seals are formed by angularly spaced heat sealing bars which are carried on a rotary drum, the circumferential spacing between the sealing bars being adjusted automatically to compensate for variations in the repeat interval.

A more detailed object is to adjust the circumferential spacing between the seal bars by automatically moving the bars radially inwardly or outwardly relative to the drum in response to signals resulting from detection of the photoelectric targets on the web.

The invention also resides in the provision of unique mechanism for radially adjusting and radially retracting the seal bars.

These and other objects and advantages of the invention will become more apparent from the following detailed description when taken in conjunction with the accompanying drawings.

BRIEF DESCRIPTION OF THE DRAWINGS

FIG. 4 is a fragmentary cross-section taken substantially along the line 4—4 of FIG. 3.

FIG. 5 is a view similar to FIG. 4 but shows certain parts of the mechanism in moved positions.

DETAILED DESCRIPTION OF THE PREFERRED EMBODIMENT

Figure 1:
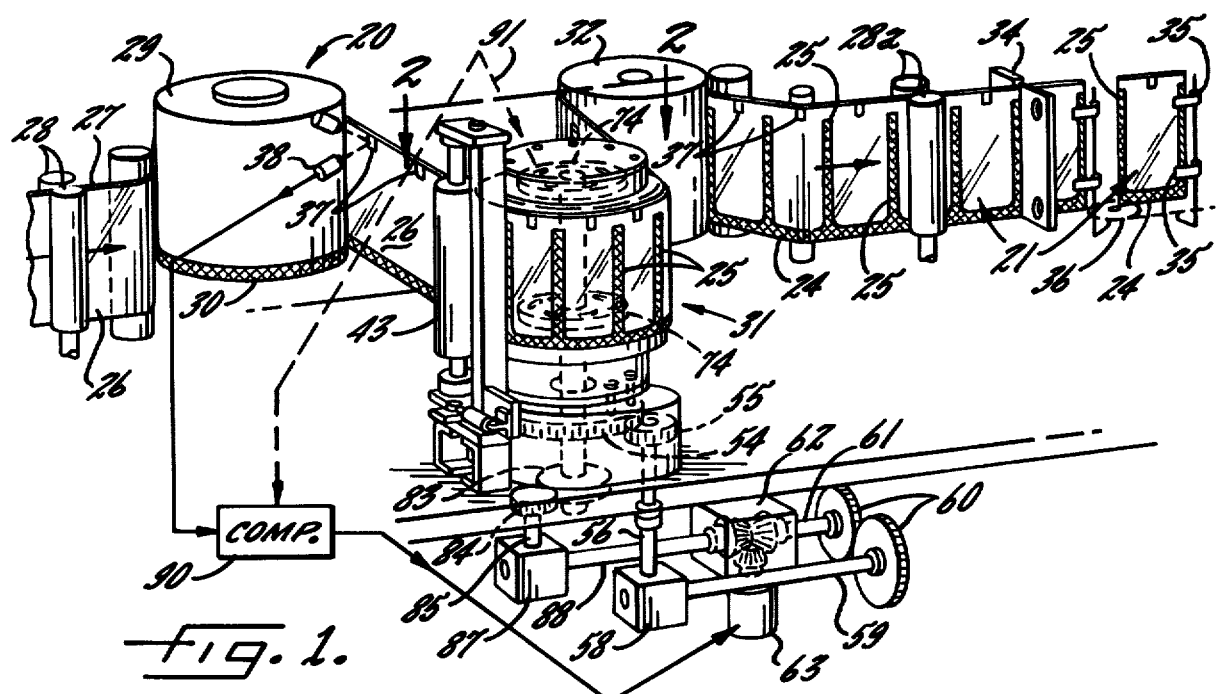
FIG. 1 is a perspective view which schematically shows a packaging machine equipped with a new and improved side sealing mechanism incorporating the unique features of the present invention.

As shown in the drawings for purposes of illustration, the invention is embodied in a packaging machine 20 for forming, filling and closing pouches 21 each composed of two rectangular panels disposed face-to-face and joined together at their margins, preferably by a fold and a heat seal 24 at the bottom and by heat seals 25 at the sides. The pouches may range in width from 4½ inches to 7 inches and are adapted to be handled by the machine at rates as high as 250 pouches per minute.

Herein, the pouches 21 are made from a web of sheet material either composed of or coated on one side with a thermoplastic material and drawn off of a supply roll (not shown) rotatable about a horizontal axis. As the web is advanced, it is folded longitudinally and upwardly to form two face-to-face strips 26 and 27 (FIG. 2) which are joined at their bottom margins by a fold. The strips are disposed in a vertical plane and, in the present instance, are advanced with high speed continuous motion as opposed to slower intermittent or step-by-step motion. For this purpose, two pair of continuously rotating feed rolls 28 and 28a (FIG. 1) engage opposite sides of the strips and respectively draw the web material off of the supply roll and through the pouch forming section of the machine 20.

As the strips 26 and 27 are advanced by the feed rolls 28 and 28a, the strips are guided around a continuously rotating sealing drum 29 (FIG. 1) having a heated, ring-like sealing bar 30 which engages the forward strip 26 to seal the bottom margins of the strips together and form the bottom seal 24. Thereafter, the strips are guided past a side sealing mechanism 31 which forms the side seals 25 by sealing the strips together along vertical bands located at equally and longitudinally spaced positions along the strips. The strips then are guided around a continuously rotating cooling drum 32 which chills the newly formed seals.

At periodic intervals, a cutter 34 severs successive pouches 21 from the leading end portion of the strips 26 and 27 by cutting through the seals 25 intermediate their edges so that each seal 25 forms the trailing side seal of one pouch and the leading side seal of the next pouch. The cutter has been shown only schematically in FIG. 1 since its details form no part of the present invention. It should be understood, however, that the cutter is of the type which is capable of cutting through the strip while the latter is advanced with continuous motion. Reference may be had to the abovementioned Nutting et al patent for a disclosure of a cutter which acts on a continuously moving pouch strip. That patent also contains a detailed disclosure of mechanisms for folding, sealing and advancing a pouch strip. The specific cutter of the present machine 20 is disclosed in detail in Burton U.S. Pat. No. 4,299,151.

After being separated from one another, the pouches 21 are accelerated to a desired spacing and are gripped by carriers 35 attached to a continuously moving chain 36 which advances the pouches through a filling station where a quantity of product such as food product is deposited into the open upper ends of the pouches. Thereafter, the upper ends of the pouches are sealed to enclose the product in the pouches. Reference also may be had to the aforementioned Nutting et al patent for a detailed disclosure of apparatus for advancing and filling the pouches and for sealing the upper ends thereof.

Conventionally, the lower side of the web which is drawn off of the supply roll is pre-printed with a repeating pattern of labeling information and decorative material, the pattern having a repeat interval which is substantially equal to the width of the pouches 21. When the web is folded, the printed material appears on the outer sides of the strips 26 and 27 as a series of longitudinally spaced blocks and ultimately appears on the outer sides of the pouches. In order for the pouches to have the proper appearance, it is necessary for each side seal 25 to register with or to be centered precisely on the space between adjacent blocks of the printed material so that each pouch contains a complete block which is centered with respect to the pouch. Also, it is necessary for the cutter 34 to separate the pouches substantially at the middle of each side seal.

In order to enable the pouches 21 to be sealed and cut in registration with the printed blocks, it is conventional practice to pre-print the web with photoelectric targets 37 (FIG. 1) which are spaced from one another in accordance with the pitch of the blocks. As the strips 26 and 27 are advanced, a photoelectric detector 38 senses the targets and produces an electrical signal or pulse each time one of the targets passes the detector. The frequency of the output pulses from the detector is indicative of the spacing between the targets and thus is indicative of the pitch of the printed blocks. Such photoelectric detection systems are per se well known and are per se widely used in the art of packaging machines. In the present machine 20, the signals resulting from detection of the targets are used to control the speed of the feed rolls 28a in accordance with operation of the cutter 34 so as to cause the feed rolls to present a side seal to the cutter each time the latter is actuated.

While the targets 37 and the photoelectric detector 38 are very useful in maintaining proper registration, a problem is created by the fact that the spacing between the targets and the printed blocks may not be exactly equal or may not be precisely at an optimum value throughout the entire length of the web. For example, the web may be stretched by different amounts as it is advanced. Changes in temperature may result in the spacing between the targets being greater or less than optimum. Also, the process by which the web is printed may not be absolutely perfect and may result in variations in the spacing of the targets 37. Thus, there is no assurance that the spacing between the targets 37 (and thus the printed blocks) is perfectly uniform throughout the length of the web or from web-to-web.

In accordance with the present invention, provision is made of a unique drum-type side sealing mechanism 31 which is capable of forming the side seals 25 at high speeds and preferably with continuous motion and which is capable of automatically adjusting to compensate for any variations in the spacing between the targets 37 and the printed blocks. As a result, the side sealing mechanism forms the side seals in proper registration with the printed material even though the spacing between adjacent printed blocks may not be uniform throughout the length of the web.

More specifically, the side sealing mechanism 31 comprises a drum 40 adapted to rotate continuously in a counterclockwise direction (FIG. 2) and about an upright axis. Carried by the drum are several (herein, eight) electrically heated sealing bars 41 which are spaced circumferentially around the drum in accordance with the longitudinal spacing between the side seals 25. As the strips 26 and 27 are advanced, they are guided around the forward half of the drum and are maintained under tension. The rear side of the rear strip 27 frictionally engages the group of seal bars on the forward half of the drum and, as a result of such engagement, the rear strip causes the drum to turn about its axis. At the same time, the seal bars seal the rear strip 27 to the forward strip 26 to form the side seals 25. As the strips first become tangent to the drum, a pressure roller 43 (FIG. 2) acts against the forward strip and presses the rear strip against the sealing bars 41 as each bar approaches a nine o'clock position. The roller is rotatably supported by a pivoted bracket 44 and may be released from the strips by swinging the bracket in a counterclockwise direction (FIG. 2) by means of a pneumatic actuator 45 which is attached to the bracket.

Figure 3:
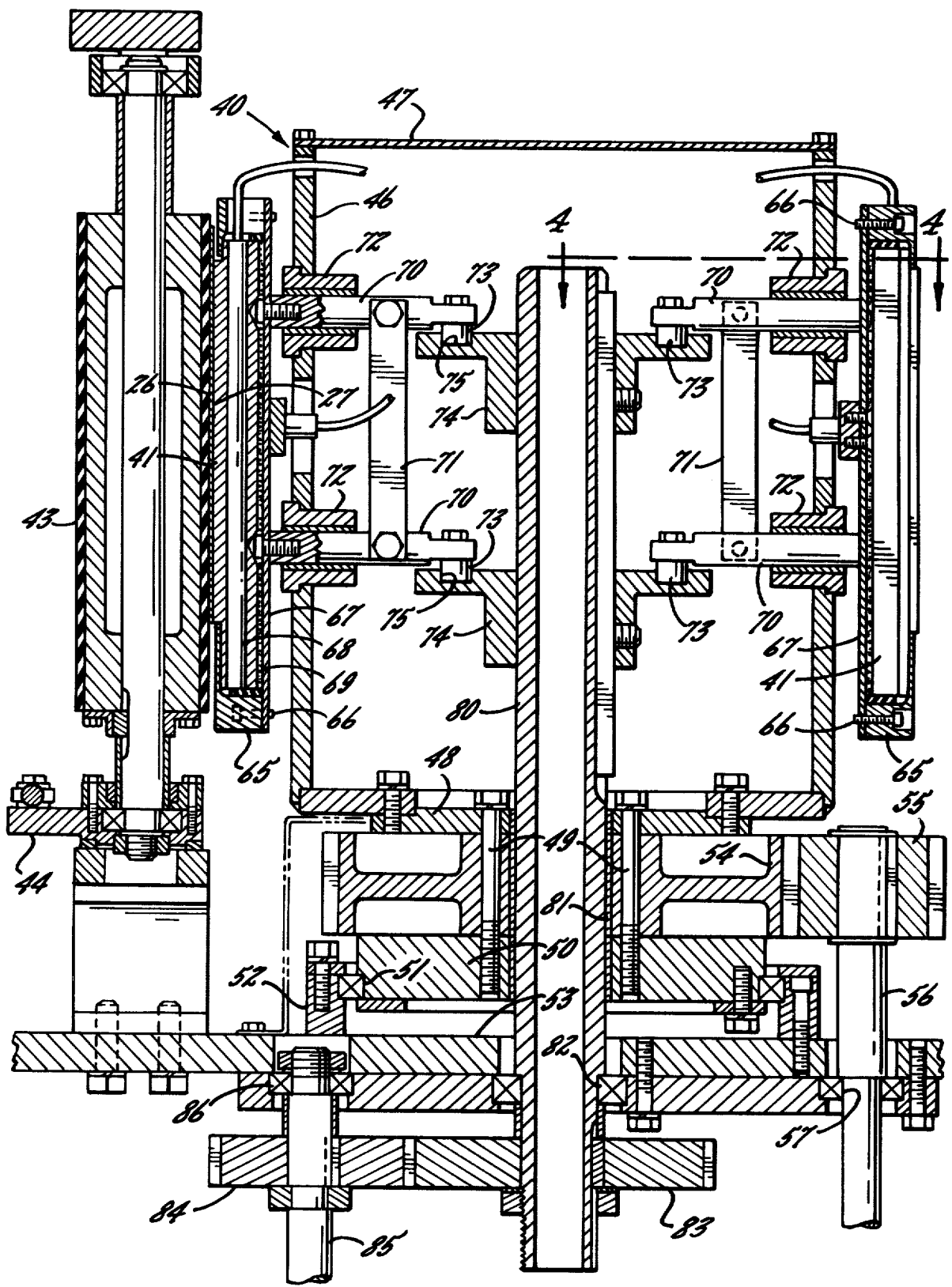
FIG. 3 is an enlarged fragmentary cross-section taken substantially along the line 3—3 of FIG. 2.

As shown in FIG. 3, the drum 40 comprises a vertical cylindrical shell 46 whose top is closed by a plate 47 and whose bottom is closed by a ring 48. Screws 49 fasten the ring 48 to a lower ring 50 rotatably supported by a bearing 51 which, in turn, is mounted in a bearing block 52 secured to the main support or frame 53 of the machine 20.

For a purpose which will become apparent subsequently, a gear 54 (FIG. 3) is sandwiched between the rings 48 and 50 and is secured rigidly thereto by the screws 49. The gaer meshes with a pinion 55 which is keyed to an upright shaft 56 journaled in the frame 53 by a bearing 57. The lower end of the shaft is connected to a right angle gear box 58 (FIG. 1) whose output shaft 59 is connected by gears 60 to a shaft 61 which forms one input of a differential gear box 62. The other input of the differential is formed by a reversible electric correction motor 63.

Each seal bar 41 is located within a vertically elongated slot formed in a shoe 65 (FIG. 2) which defines the peripheral surface of the drum 40. The outer face of each of the eight shoes is convex and is arcuately curved about the axis of the drum. The outer face of each sealing bar corresponds in shape to the side seal 25.

At the upper and lower end portions of each shoe 65, two screws 66 (FIG. 4) are located on opposite sides of the seal bar 41 and secure the shoe to an inner mounting plate 67 which closes off the inner side of a cavity formed in the shoe. The heads of the screws are accommodated within small recesses which are formed in the shoe.

An electrical resistance heating element 68 (FIGS. 3 and 4) is associated with each sealing bar 41 and is adapted, when energized, to heat the sealing bar to a high temperature. Electrical current may be conducted to the several heating elements by way of a slip ring assembly (not shown) coaxial with the drum 40. A thermal isolation block 69 (FIG. 4) is located within the cavity of each shoe 65 to insulate the shoe thermally from the heating element and the sealing bar.

As shown in FIG. 3, upper and lower rods 70 are secured to and project inwardly from the mounting plate 67 of each seal bar 41 and are fastened together by a verticval strap 71 located within the drum 40. In carrying out the invention, the rods lie along radii of the drum and are supported for in and out radial sliding by guide bushings 72 mounted in the shell 46 of the drum. Rotatably mounted on and depending from the inner ends of the rods 70 are cam followers or rollers 73 which coact with two vertically spaced actuators 74 to effect in and out movement of the seal bars 41. Herein, each actuator 74 is in the form of a disc having eight angularly spaced identical cam surfaces which are defined by curved slots 75 formed in the upper side of the disc. The rollers 73 fit into the slots 75 and, when the discs are turned either clockwise or counterclockwise, the slots and the rollers coact to either advance the seal bars outwardly (FIG. 4) or retract the bars inwardly (FIG. 5). Since the rods 70 lie along radii of the drum, the circumferential spacing between the bars 41 is increased whlen the bars are advanced outwardly and, in addition, the effective outer diameter of the drum 40 is increased. Conversely, the circumferential spacing between the bars and the effective outer diameter of the drum are decreased when the bars are retracted inwardly. When the bars are in their innermost positions, there is only a very small gap between the ends of adjacent shoes 65 (see FIG. 5).

Figure 2:
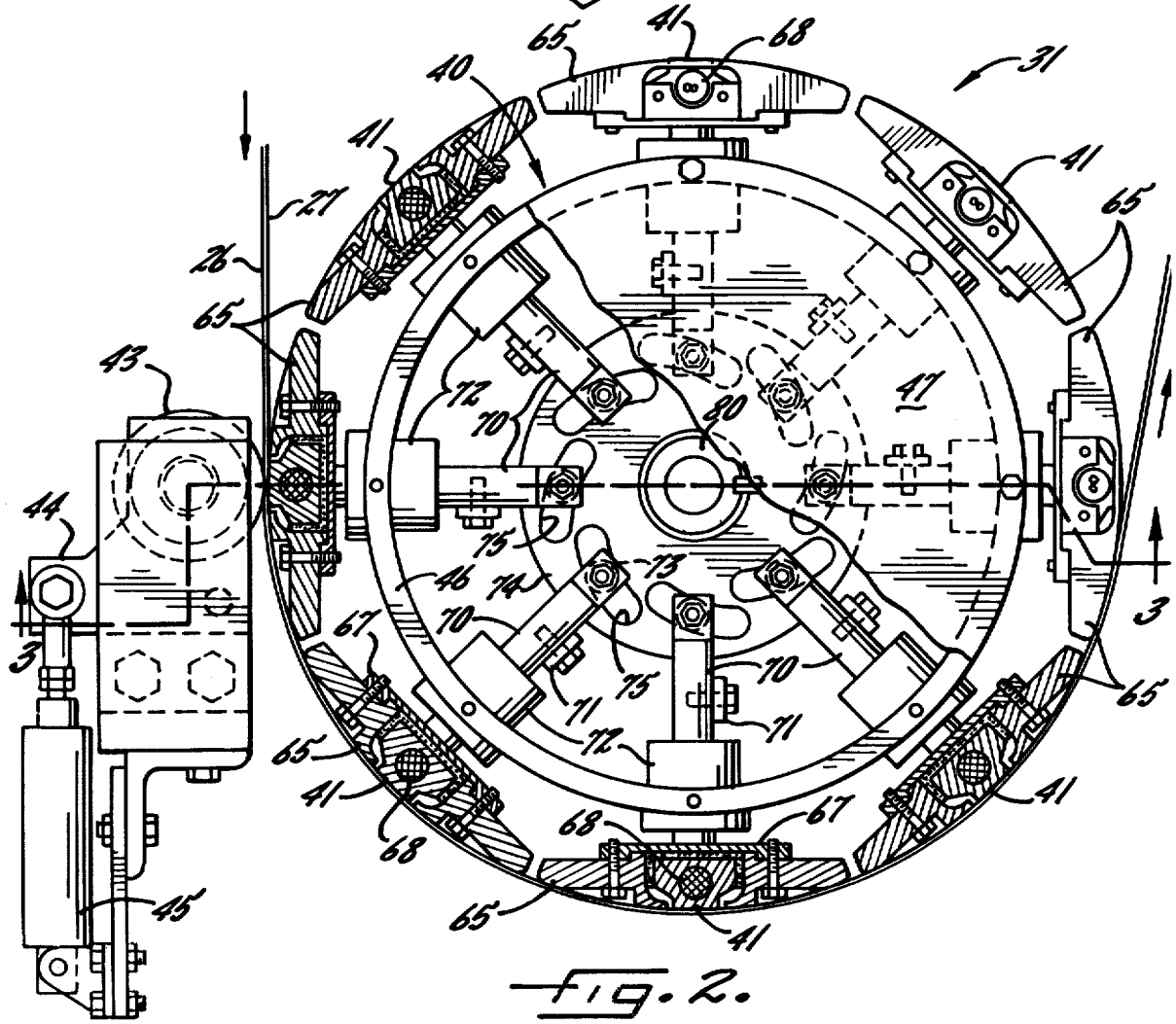
FIG. 2 is an enlarged top plan view of the side sealing mechanism as taken along the line 2—2 of FIG. 1, certain parts being broken away and shown in section.

The discs 74 are telescoped on and are keyed to the upper end portion of an upwardly extending tubular shaft 80 (FIG. 3) which is coaxial with the drum 40. A sleeve bearing 81 journals the shaft within the rings 48 and 50 and the gear 54 while a ball bearing 82 rotatably supports the lower end portion of the shaft on the frame 53. A gear 83 is secured to the lower end portion of the shaft 80 and meshes with a pinion 84 which is secured to a vertical shaft 85 whose upper end portion is journaled in the frame by a ball bearing 86. As shown in FIG. 1, the lower end portion of the shaft 85 is connected into a right angle gear box 87 having a shaft 88 which forms the output of the differential 62.

OPERATION

The correction motor 63 of the differential 62 is de-energized as long as the circumferential spacing between the seal bars 41 coincides with the spacing between the targets 37 on the strips 26 and 27 and as long as the side seals 25 are being formed in registration with the printed material on the strips. As the drum 40 is rotated by the advancing strips, the gear 54 acts through the pinion 55, the shaft 56, the gear box 58, the shaft 59 and the gears 60 to backdrive the input shaft 61 of the differential 62 in timed relationship with the drum. As long as the correction motor 63 is de-energized, the output shaft 88 of the differential 62 is rotated in phase with the input shaft 61 and acts through the gear box 87, the shaft 85, the pinion 84 and the gear 83 to rotate the shaft 80 in phase with the drum. The ratio of the various gears are such that the shaft 80 is rotated in the same direction and at the same R.P.M. as the drum 40 when the correction motor 63 is de-energized. As a result, the cam discs 74 are rotated in unison with the drum 40 and the seal bars 41 and thus the discs do not effect any change in the radial position of the seal bars.

Because of one or more of the factors mentioned previously, it is possible that, sometime during operation of the machine 20, there may be a tendency for the side seals 25 to be formed out of perfect registration with the printed material on the strips 26 and 27. For example, slippage of the strips or the cumulative effect of printing tolerances could, if left uncompensated, result in the side seals 25 being formed either slightly ahead of or slightly behind the spaces between the blocks of printed material. If this tends to occur, the photoelectric detector 38 causes the correction motor 63 to be momentarily energized in one direction or the other. When energized, the correction motor acts through the differential 62 and, depending upon its direction of rotation, acts to mementarily advance or momentarily retard rotation of the shafts 88 and 80 with respect to the input normally applied via the shaft 61. If rotation of the shaft 80 is advanced, the cam discs 74 are rotated clockwise relative to the drum 40 (while still rotating with the drum) and cause the seal bars 41 to advance outwardly to increase the circumferential spacing between the seal bars and increase the effective diameter of the drum (see FIG. 4). Retardation of the shaft 80 results in the discs turning counterclockwise relative to the drum so as to retract the seal bars and decrease their circumferential spacing and the effective diameter of the drum as shown in FIG. 5.

In this way, the circumferential spacing between the seal bars 41 can be changed automatically to match the spacing between the printed blocks on the strips 26 and 27. Thus, proper registration can be maintained between the side seals 25 and the printed blocks even though the repeat interval of the blocks may not be uniform throughout the length of the web.

Importantly, changing of the circumferential spacing between the seal bars 41 does not result in any relative circumferential movement between the seal bars and the inner strip 27 and thus no "smearing" of the seals 25 occurs when the bars are adjusted. When the bars are moved outwardly to increase the circumferential spacing therebetween, the bars simply increase the effective diameter of the drum and push the strips outwardly without moving relative thereto. Any surplus material which might be necessary to enable the bars to push the strips outwardly can be gained from the material accumulated in the tension roll system (not shown) upstream of the bottom sealing drum 29. The tension roll system also takes up any slack and keeps the strips tensioned around the bars when the bars are moved radially inwardly and decrease the effective diameter of the drum 40.

The details of the specific system for controlling the correction motor 63 do not form part of the present invention and many such systems are commercially available. Simply by way of a brief example, the pulses from the detector 38 may be routed as a command signal to electronic circuitry having a comparator 90 (FIG. 1) operable to control the correction motor 63. Pulses representative of the actual spacing between the seal bars 41 may be produced by a second photoelectric detector 91 located adjacent the rear side of the drum 40, such pulses being routed to the comparator as a feedback signal. As long as the command and feedback pulses are in phase, the output of the comparator is zero and thus no signal is supplied to the correction motor 63. If the feedback pulses either lag or lead the command pulses, the comparator produces an error signal of proper polarity to energize the correction motor in a direction to advance or retard the shaft 80 until the error is reduced to zero. The circuitry may include suitable averaging, filtering and/or threshold networks to impart stability to the operation of the correction motor.

We claim:

1. Mechanism for sealing together two face-to-face strips of heat-sealable material at longitudinally spaced positions along the strips as the latter are advanced with continuous motion along a predetermined path, one of said strips having targets spaced longitudinally therealong with the spacing between successive targets being approximately equal, said mechanism comprising a frame, a drum mounted on said frame to rotate about a predetermined axis, a plurality of heat sealing bars carried by and spaced circumferentially around said drum, one of said strips engaging said sealing bars as said strips are advanced along said path, means mounting said sealing bars on said drum to move radially inwardly and outwardly relative to the drum to thereby enable the radial position and the circumferential spacing of said sealing bars to be changed, an actuator connected to said sealing bars and rotatable with said drum, said actuator also being rotatable relative to said drum and being operable when so rotated to move said sealing bars radially inwardly or outwardly relative to said drum, means for detecting said targets and for producing command signals indicative of the spacing between said targets, means for detecting said sealing bars and for producing feedback signals indicative of the circumferential spacing of said sealing bars, means for comparing said command and feedback signals, and power-operated means responsive to said comparing means and operable to rotate said actuator relative to said drum when the spacing between said sealing bars differs from the spacing between said targets.

2. Mechanism as defined in claim 1 in which said actuator comprises a cam having a plurality of angularly spaced and substantially identical cam surfaces corresponding in number to the number of sealing bars, and a cam follower connected to each of said sealing bars and engageable with one of said cam surfaces.

3. Mechanism as defined in claim 2 in which said cam is rotatable to said drum about said axis.

4. Mechanism as defined in claim 3 further including a shaft coaxial with said axis and rotatable relative to said drum, said cam being rotatable with said shaft, said power-operated means being operable normally to cause said shaft to rotate continuously at the same speed as said drum and being capable of rotating said shaft relative to said drum.

5. Mechanism as defined in claim 1 in which said one strip frictionally engages said drum and turns said drum as said strips are advanced, and mechanism connected between said drum and said actuator for rotating said actuator in unison with said drum.

6. Mechanism as defined in claim 1 in which the strip which engages said sealing bars causes said drum to rotate with continuous motion as said strips are advanced, a shaft coaxial with said axis and rotatable relative to said drum, said actuator comprising a cam rotatable with said shaft, said cam having a plurality of angularly spaced and substantially identical cam surfaces corresponding in number to the number of sealing bars, a cam follower connected to each of said sealing bars and engageable with one of said cam surfaces, and mechanism connected between said drum and said shaft for rotating said shaft and said cam in unison with said drum as long as the spacing between said sealing bars is the same as the spacing between said targets.

* * * * *